(12) United States Patent
Pohlen et al.

(10) Patent No.: US 12,296,560 B2
(45) Date of Patent: May 13, 2025

(54) GLASS PRODUCT AND METHOD FOR MAKING A GLASS PRODUCT

(71) Applicant: ACR II GLASS AMERICA INC., Nashville, TN (US)

(72) Inventors: Markus Walter Pohlen, Mückeln (DE); Olivier Farreyrol, Wasserbillig (LU)

(73) Assignee: ACR II GLASS AMERICA INC., Nashville, TN (US)

( * ) Notice: Subject to any disclaimer, the term of this patent is extended or adjusted under 35 U.S.C. 154(b) by 0 days.

(21) Appl. No.: 18/571,518

(22) PCT Filed: Jun. 17, 2022

(86) PCT No.: PCT/US2022/034066
§ 371 (c)(1),
(2) Date: Dec. 18, 2023

(87) PCT Pub. No.: WO2022/266488
PCT Pub. Date: Dec. 22, 2022

(65) Prior Publication Data
US 2024/0278542 A1    Aug. 22, 2024

Related U.S. Application Data

(60) Provisional application No. 63/211,865, filed on Jun. 17, 2021.

(51) Int. Cl.
*B32B 17/10*    (2006.01)
*B32B 7/12*    (2006.01)
(Continued)

(52) U.S. Cl.
CPC ......... *B32B 17/10504* (2013.01); *B32B 7/12* (2013.01); *B32B 17/10201* (2013.01); *G02F 1/134381* (2021.01); *G02F 1/139* (2013.01); *B32B 2250/03* (2013.01); *B32B 2255/20* (2013.01); *B32B 2305/55* (2013.01); *B32B 2307/202* (2013.01); *B32B 2307/204* (2013.01); *B32B 2307/40* (2013.01); *B32B 2311/00* (2013.01); *B32B 2315/08* (2013.01); *B32B 2605/006* (2013.01); *G02F 1/1334* (2013.01)

(58) Field of Classification Search
CPC ........ B32B 17/10504; B32B 17/10495; B32B 17/10; B32B 17/10467; B32B 17/10201; B32B 2315/08; B32B 2605/006; B32B 2305/55; B32B 2255/20; G02F 1/139; G02F 1/1334; G02F 1/133311
See application file for complete search history.

(56) References Cited

U.S. PATENT DOCUMENTS 6,055,088 A    4/2000   Renaud et al.
2011/0170170 A1*   7/2011   Boote ............... B32B 17/10036
                                                          359/296

FOREIGN PATENT DOCUMENTS

WO    2010032070 A1    3/2010

* cited by examiner

*Primary Examiner* — Angela M. Medich
(74) *Attorney, Agent, or Firm* — K&L Gates LLP; Shu Chen

(57) ABSTRACT

A glass product having a glass piece, an adhesive layer, and a switchable film having variable light transmission sequentially including: a first base layer, a first electrode, a functional layer, a second base layer, and a second electrode. The second base layer is positioned between the functional layer and the second electrode.

9 Claims, 2 Drawing Sheets

(51) Int. Cl.
*G02F 1/1343* (2006.01)
*G02F 1/139* (2006.01)
G02F 1/1334 (2006.01)

GLASS PRODUCT AND METHOD FOR MAKING A GLASS PRODUCT

CROSS REFERENCE TO RELATED APPLICATIONS

This application is a national phase entry of PCT/US2022/034066 filed Jun. 17, 2022, which claims priority to U.S. Provisional Application No. 63/211,865, filed on Jun. 17, 2021, entitled "GLASS PRODUCT AND METHOD OF PRODUCING GLASS PRODUCT," the entire contents of which are incorporated by reference herein in their entirety.

TECHNICAL FIELD

The present disclosure is generally related to a glass product having the switchable film and a method of making such a glass product.

BACKGROUND

Switchable films, functionally changing in light transmission under electrical power, may be used in automotive glazings to provide variably transparent windows. The switchable films may be laminated in a glazing between two glass sheets. The switchable film may have two electrode layers to be connected to a power source through a busbar and wiring. In a conventional switchable film, one electrode layer may be electrically connected by a busbar and wiring extending from the switchable film between the glass sheets. The other electrode layer may be connected to a busbar on an opposite side of the switchable film from the first electrode layer busbar. Since the position of busbars to electrically connect the electrode layers are opposite to each other in relation to the switchable film, the process to form such busbars and wiring is complicated. Thus, a more simplified structure is desired.

SUMMARY OF THE DISCLOSURE

Disclosed herein is a glass product comprising: a glass piece and a switchable film having variable light transmission on the glass piece including: a first base layer, a first electrode, a functional layer, a second base layer, and a second electrode. The second base layer is positioned between the functional layer and the second electrode.

In some embodiments of the present disclosure, the switchable film may be a liquid crystal film.

In some embodiments of the present disclosure, the second electrode may include a protective coating layer. The protective coating layer may include an inorganic oxide. The protective coating layer may include an inorganic nitride.

In some embodiments of the present disclosure, the first electrode and the second electrode may include a metal oxide. The first electrode and the second electrode may include indium tin oxide.

In some embodiments of the present disclosure, the second electrode may include a laminate of a conductive layer and a dielectric layer. The conductive layer may include silver. The second electrode may include a low-E coating.

In some embodiments of the present disclosure, the second electrode is disposed at an outer surface of the glass product. The glazing may have a normal level of emission of the low-emissivity coating at 283 K is of 0.3 or less.

Further disclosed herein is a method of making a glass product according to this disclosure, including adhering a switchable film to a glass piece.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
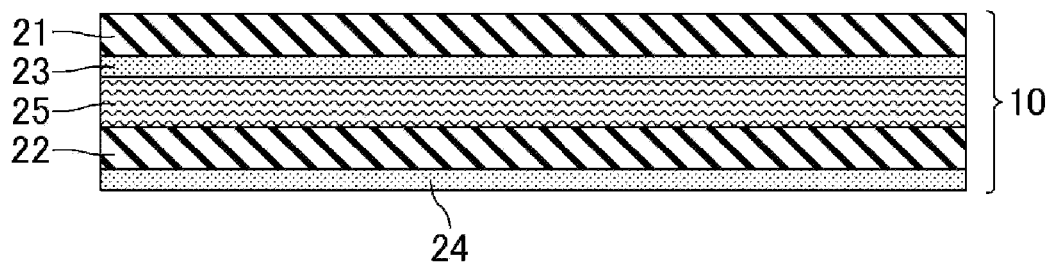
FIG. 1 illustrates a cross section of a switchable film, according to an exemplary embodiment of the present disclosure.

In the following description, for purposes of explanation, specific details are set forth in order to promote a thorough understanding of one or more aspects of the disclosure. It may be evident in some or all instances, however, that any aspects described below can be practiced without adopting the specific design details described below.

This disclosure relates generally to a glass product having a glass piece and a switchable film having variable light transmission sequentially including: a first base layer, a first electrode, a functional layer, a second base layer, and a second electrode. The second base layer is positioned between the functional layer and the second electrode. The switchable film may be adhered to the glass piece. The second electrode of the switchable film may be disposed at an outer surface of the glass product.

Where a switchable film is laminated between interlayers in a laminated glazing, the relatively soft interlayers may allow for change in shape of the switchable film, including wrinkling of the film. Applying the film instead to a harder glass surface may allow for prevention or limitation of such wrinkling even where the glass has a complex curvature shape.

Glass products described herein may include laminated or non-laminated glazings. Such glazings may be used, for example, in automotive vehicles as windows, such as windshields, sunroofs, back windows, or side windows. The glass product may include a glass piece which may include a single glass sheet or a laminated glazing. The glass piece may be bent to a desired shape. A conventional laminated glazing may include a first glass sheet, an interlayer, and a second glass sheet laminated together. The glass sheets may be bent to a desired shape prior to lamination with an interlayer therebetween. Preferably, the glass sheets may be a soda-lime silica glass. Glass bending may preferably occur by heat treatment from 550° C. to 700° C., more preferably from 580° C. to 660° C. The interlayer may include an adhesive polymer sheet, which may include polyvinyl butyral (PVB) or ethylene vinyl acetate (EVA). An interlayer may include an ionomer sheet in some glazings. An inner glass sheet of the glazing faces a vehicle interior when installed, and an outer glass sheet faces a vehicle exterior when installed.

A switchable film as used herein may include a functional layer for changing in transparency due to application of a connection to an electrical power source. Switchable films may include, for example, a liquid crystal film, such as polymer dispersed liquid crystal (PDLC), polymer network liquid crystal (PNLC), or other liquid crystal films, a nanoparticle film, such as a suspended particle device (SPD), or electrochromic films. A switchable film may include, for example, a first base layer, a first electrode on the first base layer, a functional layer, a second base layer, and a second electrode. The second electrode may be formed on the second base layer. The first and second electrodes may preferably include a metal oxide, such as indium tin oxide and may be the same or different material. The first and second base layers may preferably include polymer films, such as polyethylene terephthalate (PET) and may be the same or different from each other. The first and second electrodes may be independently connected to a power source. Some switchable films may be segmented so that the segments formed may be controlled independently of each other. Segments may be formed by creating electrically isolated portions on one or both of the first and second electrodes. The segments may each require electrical connection via a busbar. The switchable film may connect to a power source via busbars formed on the electrodes. The functional layer may include any suitable material and may include, for example, liquid crystal for PDLC or PNLC or nanoparticle films for SPD. When the switchable film is powered, the switchable film may switch from a dark or opaque state to a clear state, or vice versa.

As disclosed herein, a switchable film may be adhered to a glass piece, or glazing. Particularly the switchable film may be adhered to the glass piece on an inner surface facing a vehicle interior when installed. The switchable film may be adhered to the glass piece by an adhesive layer which may include, or be formed by, a hot-melt, thermosetting, photocurable, reaction-curable, moisture-curable, or pressure-sensitive adhesive. The adhesive may include compounds based on acrylate, urethane, urethane acrylate, epoxy, epoxy acrylate, acryl, silicone, isocyanate, polyolefin, modified olefin, polypropylene, ethylene vinyl alcohol, vinyl chloride, chloroprene rubber, cyanoacrylate, polyamide, polyimide, polystyrene, polyvinyl butyral, ethylene vinyl acetate, or the like. The preferable adhesive may be selected for suitable workability and adhesion properties, as well as for providing suitable optical transparency.

The second electrode of the switchable film may include a low-emissivity (low-e) coating. The low-e coating may have an emissivity, which means a normal level of emission at 283 K according to the standard EN 12898, of 0.3 or less, preferably 0.2 or less. The sheet resistance of the low-e coating may be from 10 ohm/square to 30 ohm/square. The low-e coating may be exposed to an environment of a vehicle interior when the glazing is installed. The second electrode may include a laminate of a conductive layer and a dielectric layer. The conductive layer may include, for example, a metal oxide such as that used as an electrode for the switchable film or a metal, such as silver. The dielectric layer may include, for example, an oxide, nitride or oxynitride of silicon, aluminum, titanium, zinc, tin, chromium, nickel, zirconium, niobium, or alloy of these materials. The metal oxide may include indium tin oxide. Such a coating may improve thermal comfort inside a space with the low-e coating, such as a vehicle interior. To provide the benefits of a low-e coating, which is preferably exposed to the vehicle interior on automotive glass, an electrode of the switchable film may be provided on a surface of a base layer opposite the functional layer within the switchable film. Such a film may have a structure as shown in FIG. 1.

FIG. 1 illustrates a cross section of a switchable film 10, according to an exemplary embodiment of the present disclosure. In FIG. 1, the switchable film 10 includes the first base layer 21, the first electrode 23, the functional layer 25, the second base layer 22 and the second electrode 24. The second electrode 24 is exposed to the environment.

Figure 2:
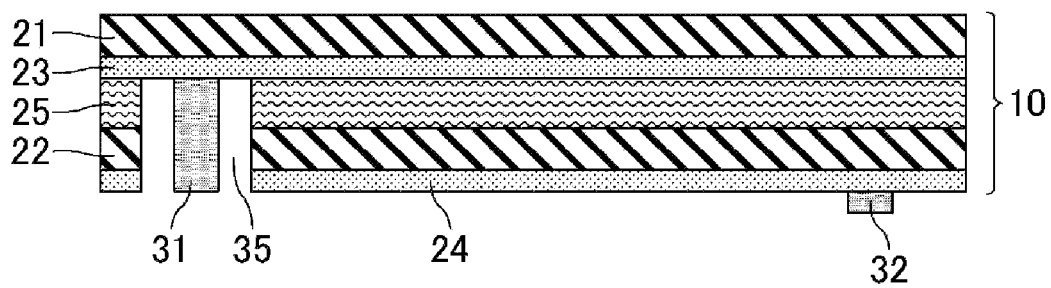
FIG. 2 illustrates a cross section of a switchable film according to an exemplary embodiment of the present disclosure and busbars are formed on each electrode of the switchable film.

FIG. 2 illustrates a cross section of a switchable film 10 according to an exemplary embodiment of the present disclosure and busbars 31, 32 are formed on the electrodes 23, 24 of the switchable film 10. In FIG. 2, a cut out portion 35 is formed to expose the first electrode 23. A first busbar 31 may be formed on the first electrode 23 within the cut out portion 35 for connection of the first electrode 23 to a power source. A second busbar 32 is formed on the second electrode 24 for connection to a power source. Since the second electrode 24 is exposed to the environment, the second busbar 32 may be easily formed on the same side of the switchable film 10 as the first busbar 31. When the second busbar 32 and the first busbar 31 may be exposed on the same side of the switchable film 10 (the lower side in FIG. 2), the busbars 31, 32 may be applied to the switchable film 10 with a simplified process. Further, the second electrode 24 may provide low-emissivity benefits to the construction without an additional coating layer in the construction. When a switchable film 10 includes more than one electrically isolated segment, each segment may be separately connected to a busbar and wiring so that the isolated segments may be electrically controllable independent of one another. Such segmentation may be accomplished by creating separation in one or both electrodes 23, 24 of the switchable film 10. The switchable film 10 of the present disclosure which can provide the simplified structure may be desirable for producing glass products.

Figure 3:
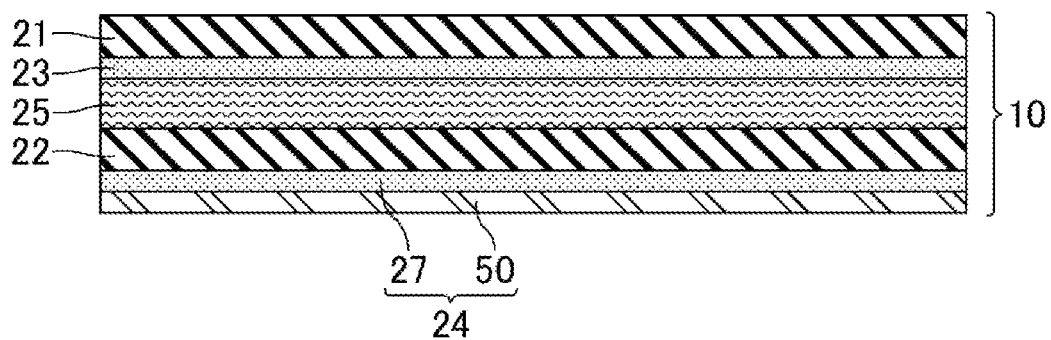
FIG. 3 illustrates a cross section of a switchable film, according to an exemplary embodiment of the present disclosure.

The second electrode 24 may include a protective coating layer on a conductive layer. FIG. 3 illustrates a switchable film 10 according to an exemplary embodiment of the present disclosure. In FIG. 3, the switchable film 10 includes the second electrode 24 in which protective coating layer 50 may be disposed on electrode layer 27. The protective coating layer 50 may provide protection for the electrode layer 27. The protective coating layer 50 may increase durability of the second electrode 24. Such a protective coating layer 50 may include a dielectric layer, for example, inorganic oxides and/or inorganic nitrides, such as $SiO_2$, SiN, $TiO_2$, TIN, $ZrO_2$, or ZrN. The protective coating layer 50 may protect the conductive layer 27 from chemical and mechanical disturbances it may be exposed to as an outer surface of the glass product. If the protective coating layer 50 is a non-conductive material, the protective coating layer 50 may be locally removed or not applied where the second busbar 32 is attached in order to achieve the electrical connection between the electrode layer 27 and the second busbar 32. The protective coating layer 50 may have physical and chemical protective qualities. Particularly, the protective coating layer 50 may have a haze value of less than 2% after the Taber test, as described in ECE R43 (updated May 2019). Further, the protective coating layer 50 may have a chemical resistance which may pass the chemical resistance test as defined in ECE R43 (updated May 2019).

Figure 4:
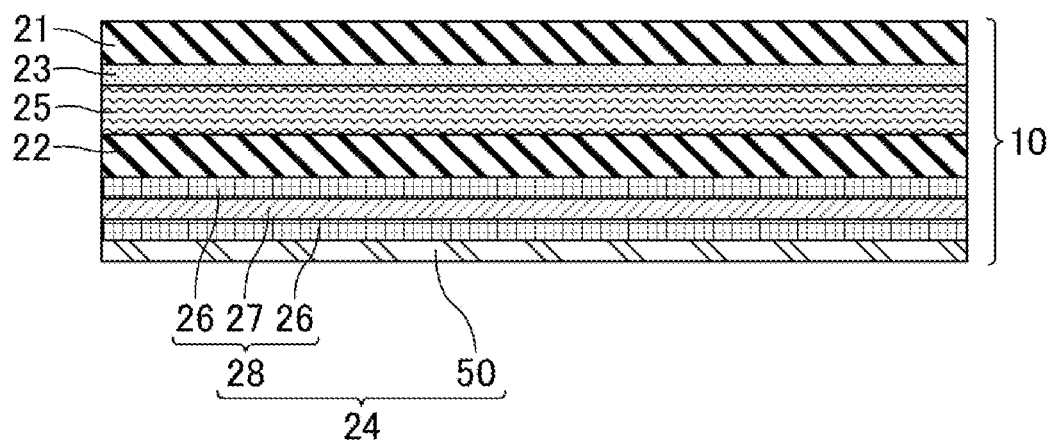
FIG. 4 illustrates a cross section of a switchable film, according to an exemplary embodiment of the present disclosure.

The second electrode 24 may include a laminate of a conductive layer 27 and a dielectric layer. FIG. 4 illustrates a switchable film 10, according to an exemplary embodiment of the present disclosure. In FIG. 4, the switchable film 10 includes the second electrode 24 being a laminate 28 of a conductive layer 27 and dielectric layers 26. The conductive layer 27 is sandwiched by the dielectric layers 26. The protective layer 50 is formed on the dielectric layer 26 of the laminate 28. The protective coating layer 50 may provide protection for the laminate 28. Thus, the second electrode 24 may include the laminate 28 and the protective layer 50.

The switchable film according to an exemplary embodiment of the present disclosure may be produced by laminating the first base layer with the first electrode, the functional layer, and the second base layer with the second electrode. The second electrode may be disposed at outermost of the switchable film in the lamination.

Figure 5:
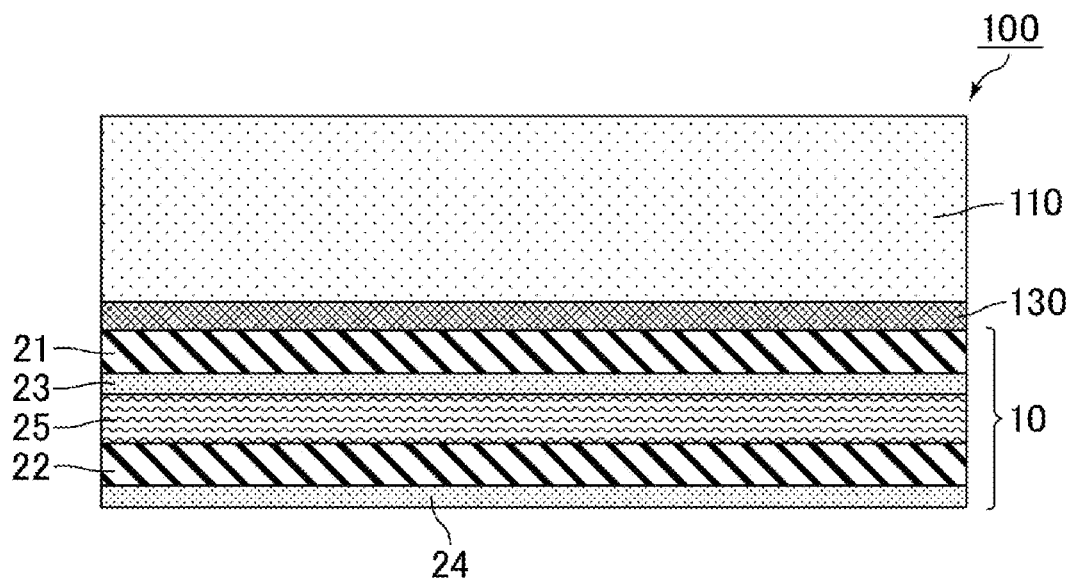
FIG. 5 illustrates a cross section of a glass product, according to an exemplary embodiment of the present disclosure.

FIG. 5 illustrates a glass product 100, according to an exemplary embodiment of the present disclosure. The glass product 100 may include a glass piece 110; an adhesive layer 130 on the glass piece 110; and a switchable film 10 adhered to the glass piece 110 via the adhesive layer 130. The second electrode 24 of the switchable film 10 may be disposed at an outer surface of the glass product. Thus, the second electrode 24 may be exposed to the environment. When the second electrode 24 of the switchable film 10 includes a low-e coating, the glass product 100 may have a low-e coating at an outer surface of the glass product 100. The glass piece 110 may be a laminated glazing or a single glass sheet.

Adhering the switchable film 10 to the glass piece 110 may be carried out by laminating the switchable film 10 and the glass piece 110 with the adhesive layer 130 therebetween, which may include laminating them via a vacuum, such as a vacuum bag degassing, or physically pressing them with a roller. The adhering may be processed in a vacuum or double-vacuum thermoforming process such that the first contact of adhesive layer 130 and the glass piece 110 will be under vacuum which may avoid air bubbles in the interface between the glass piece 110 and the adhesive layer 130.

The adhering may be carried out at an ambient temperature, i.e. about 10 to 40° C., when the adhesive layer 130 includes a photocurable, reaction-curable, moisture-curable, or pressure-sensitive adhesive. Adhering at an ambient temperature may be preferable since it can avoid a damage of the switchable film 10 caused by heating where the switchable film 10 is sensitive to heating.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A glass product, comprising:
    a glass piece; and
    a switchable film having variable light transmission adhered to the glass piece by an adhesive layer, wherein the switchable film has a structure of:
        a first base layer,
        a first electrode,
        a functional layer,
        a second base layer, and
        a second electrode including a laminate of a conductive layer and a dielectric layer, the second electrode providing a low-emissivity coating,
    wherein the second base layer is positioned between the functional layer and the second electrode, wherein the second electrode is disposed at an outer surface of the glass product.

2. The glass product according to claim 1, wherein the functional layer is a liquid crystal layer.

3. The glass product according to claim 1, wherein the second electrode includes a protective coating layer.

4. The glass product according to claim 3, wherein the protective coating layer includes an inorganic oxide.

5. The glass product according to claim 3, wherein the protective coating layer includes an inorganic nitride.

6. The glass product according to any one of claims 1, wherein the first electrode and the second electrode include a metal oxide.

7. The glass product according to claim 6, wherein the first electrode and the second electrode include indium tin oxide.

8. The glass product according to claim 1, wherein the conductive layer includes silver.

9. The glass product according to claim 1, wherein a normal level of emission of the low-emissivity coating at 283 K is of 0.3 or less.

* * * * *